(12) United States Patent
Cozzi et al.

(10) Patent No.: US 7,595,742 B2
(45) Date of Patent: Sep. 29, 2009

(54) SYSTEM AND METHOD FOR GENERATING LANGUAGE SPECIFIC DIACRITICS FOR DIFFERENT LANGUAGES USING A SINGLE KEYBOARD LAYOUT

(75) Inventors: Alex Cozzi, San Jose, CA (US); Steve Brent Cousins, San Jose, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1232 days.

(21) Appl. No.: 10/904,242

(22) Filed: Oct. 29, 2004

(65) Prior Publication Data

US 2006/0100848 A1    May 11, 2006

(51) Int. Cl.
H03K 17/94    (2006.01)
(52) U.S. Cl. .............................. 341/28; 341/22; 704/8; 400/110; 400/484
(58) Field of Classification Search .................. 341/20, 341/22, 28; 400/110, 484; 704/8
See application file for complete search history.

(56) References Cited

U.S. PATENT DOCUMENTS

| | | | | |
|---|---|---|---|---|
| 4,204,089 | A | 5/1980 | Key et al. | 178/30 |
| 4,454,592 | A | 6/1984 | Cason et al. | 345/708 |
| 4,580,916 | A * | 4/1986 | Rolfo et al. | 400/109 |
| 5,802,482 | A * | 9/1998 | Sun | 704/8 |
| 5,893,133 | A | 4/1999 | Chen | 715/535 |
| 6,014,615 | A | 1/2000 | Chen | 704/3 |
| 6,073,146 | A | 6/2000 | Chen | 715/535 |
| 6,340,937 | B1 | 1/2002 | Stepita-Klauco | 341/23 |
| 6,868,280 | B2 * | 3/2005 | Savolainen et al. | 455/550.1 |
| 2004/0155869 | A1 | 8/2004 | Robinson et al. | 345/168 |

OTHER PUBLICATIONS

"Cataloguing: Voyager: Diacritics," available at: http://stauffer.queensu.ca/techserv/cat/Sec04/vgerdiacritics.html, on May 5, 2004.
"Keyboard Layout Manager," available at: http://WWW.Klm.freeservers.com/KbdEdit.html May 5, 2004, on May 5, 2004.
"Type Unicode Characters on US Keyboard with Unicode Keyboard," available at: http://WWW.fanix.com/unicode-keyboard.html, on May 5, 2004.
"Type Accented Characters on US Keyboard with Latin Key," available at: http://www.fanix.com/latin-key.html, on May 5, 2004.
"European Diacritics," http://WWW.tiro.com/di_intro.html Jul. 28, 2003, on May 5, 2004.

* cited by examiner

Primary Examiner—Timothy Edwards, Jr.
(74) Attorney, Agent, or Firm—Carlos Munoz-Bustamante

(57) ABSTRACT

A diacritic chording system uses a single standard keyboard layout to generate diacritical characters used, for example, by Latin-based languages or languages based on a Roman character set, providing a universal keyboard The key combination required to select a diacritic is consistent, independent of the language the user is typing. The diacritic chording system uses chording to obtain characters modified by diacritics, i.e., diacritical characters. The key combinations in the diacritic chord are chosen in such a way to aid memorization by positional association of the keys or by logic association of the keys within the diacritic chord. The use of a combination of positional association and logical association eliminates conflicts in mapping diacritics for different languages. The diacritic chording system also provides a screen overlay as a mnemonic to illustrate which diacritic chords provide the desired diacritical character.

20 Claims, 10 Drawing Sheets

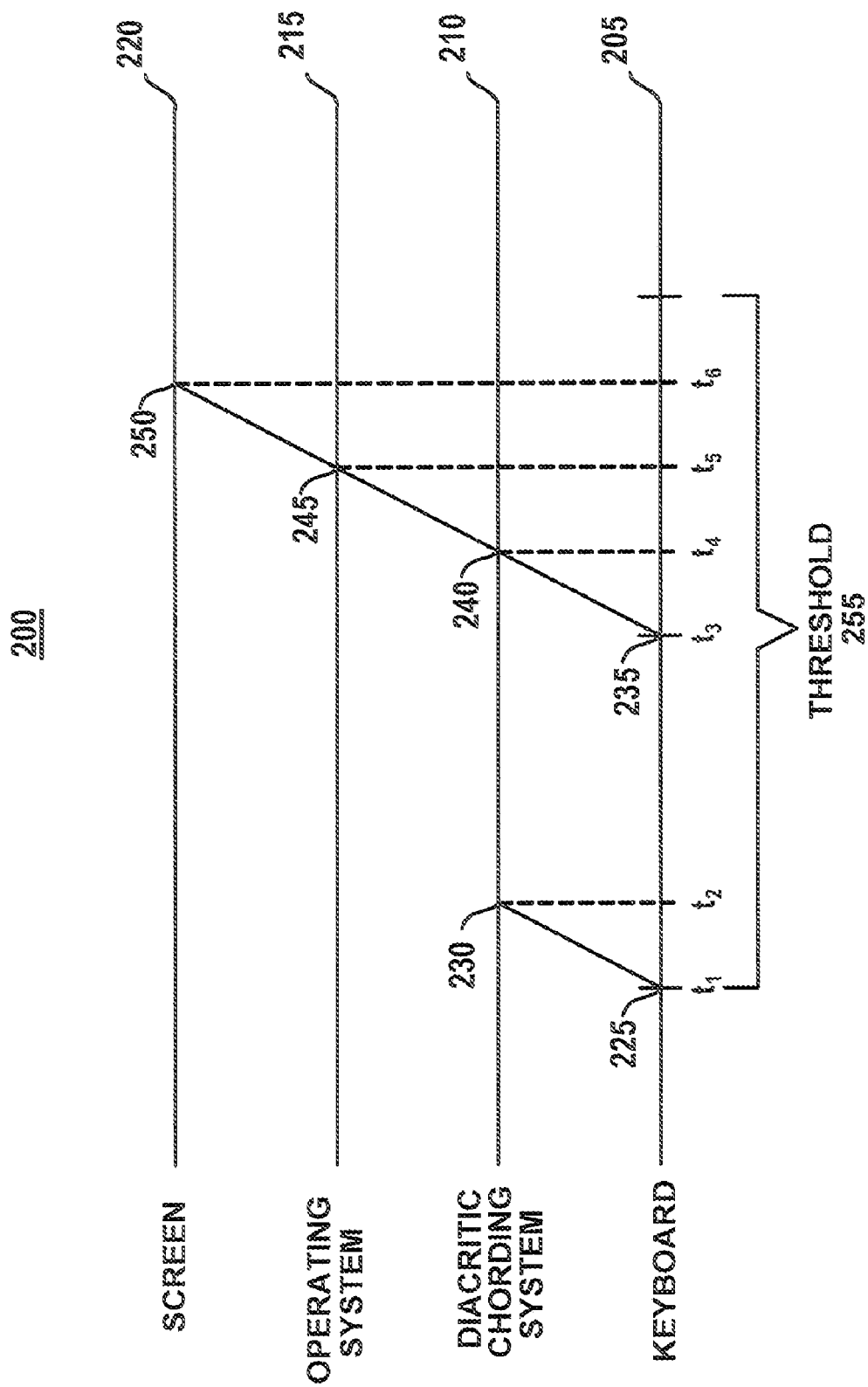

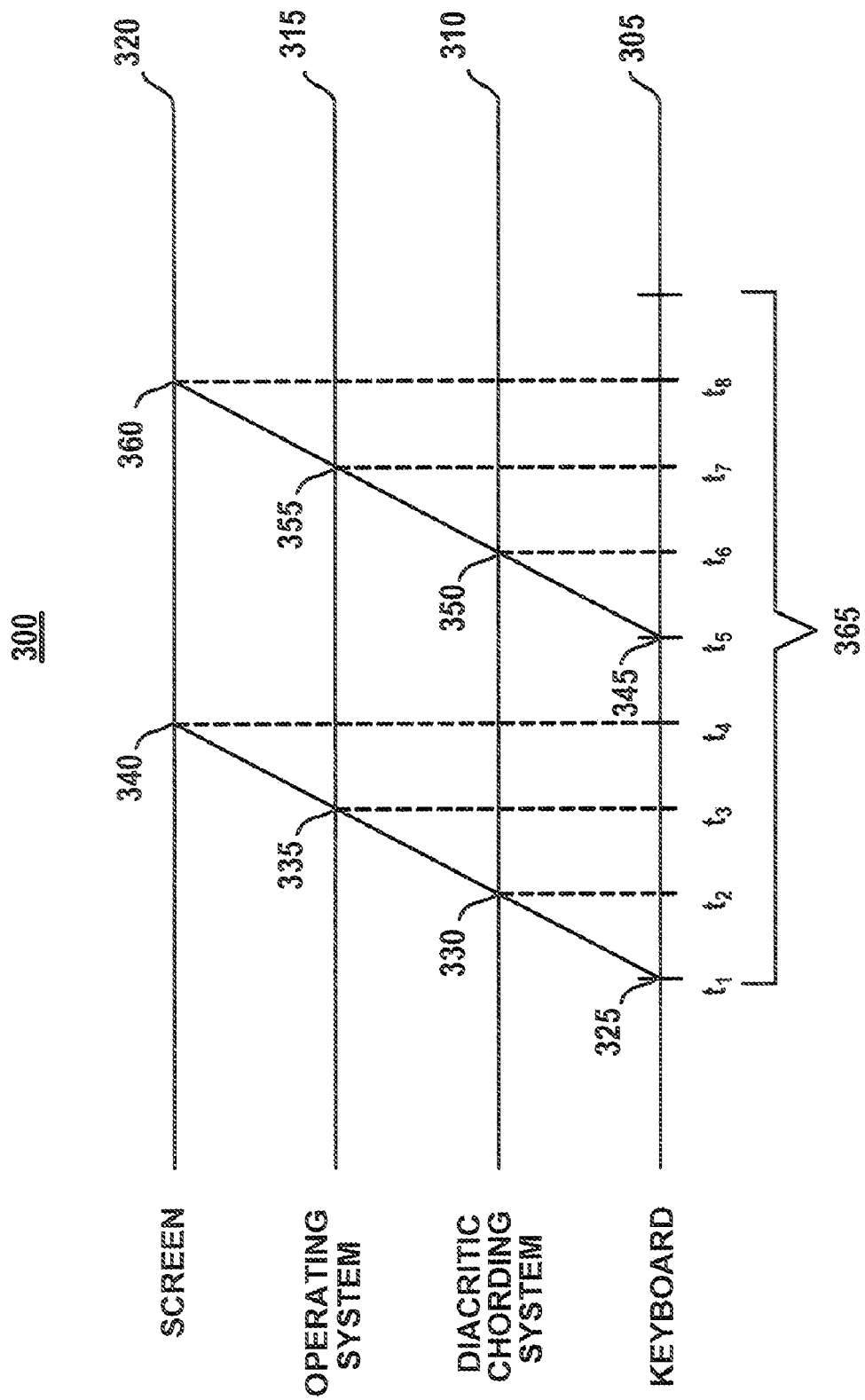

400

| | DIACRITIC CHORD | | DIACRITICAL |
|---|---|---|---|
| Key 1 | Key 2 | Key 3 | Replacement |
| a | q | | à |
| a | w | | á |
| a | @ | | å |
| a | q | w | ä |
| a | ~ | | ã |
| a | " | | ä |
| a | ^ | | â |
| a | e | | æ |
| a | u | | ă |
| a | , | | ą |
| c | t | | ć |
| c | v | | č |
| c | <space> | | ç |
| c | . | | ċ |
| d | v | | ď |
| d | - | | đ |
| d | / | | ð |
| e | 3 | | è |
| e | 4 | | é |
| e | " | | ë |
| e | 3 | 4 | ë |
| e | v | | ě |
| e | ^ | | ê |
| e | , | | ę |
| g | u | | ğ |

DIACRITIC CHORD — DIACRITICAL

| Key 1 | Key 2 | Key 3 | Replacement |
|---|---|---|---|
| g | . | | ġ |
| h | - | | ħ |
| i | 8 | | ì |
| i | 9 | | í |
| i | " | | ï |
| i | 8 | 9 | ï |
| i | k | | ı |
| i | ^ | | î |
| j | p | | ȷ |
| l | . | | ŀ |
| l | / | | ł |
| l | v | | ľ |
| n | j | | ń |
| n | ~ | | ñ |
| n | <space> | | ŋ |
| n | v | | ň |
| o | 9 | | ò |
| o | 0 | | ó |
| o | " | | ö |
| o | 9 | 0 | ö |
| o | 0 | - | ő |
| o | e | | œ |
| o | ~ | | õ |
| o | ^ | | ô |
| o | / | | ø |

| Key 1 | Key 2 | Key 3 | Diacritical Replacement |
|---|---|---|---|
| r | 5 | | ŕ |
| r | v | | ř |
| s | z | | ß |
| s | v | | š |
| s | , | | ş |
| t | , | | ţ |
| t | v | | ť' |
| t | - | | ŧ |
| t | h | | þ |
| u | 7 | | ù |
| u | 8 | | ú |
| u | " | | ü |
| u | ^ | | û |
| u | 7 | 8 | ǜ |
| u | 8 | 9 | ű |
| w | ^ | | ŵ |
| y | 7 | | ỳ |
| y | " | | ÿ |
| y | ^ | | ŷ |
| z | a | | ź |
| z | v | | ž |
| z | . | | ż |
| t | m | | ™ |
| @ | c | | © |
| @ | r | | ® |

Diacritic Chord: Key 1, Key 2, Key 3

DIACRITIC CHORD

DIACRITICAL

| Key 1 | Key 2 | Replacement |
|-------|-------|-------------|
| $ | y | ¥ |
| $ | c | ¢ |
| $ | & | € |
| $ | L | £ |

CURRENCIES TABLE

FIG. 4D

SYSTEM AND METHOD FOR GENERATING LANGUAGE SPECIFIC DIACRITICS FOR DIFFERENT LANGUAGES USING A SINGLE KEYBOARD LAYOUT

FIELD OF THE INVENTION

The present invention generally relates to a method for generating specialty characters from a generic keyboard, and in particular to generating diacritics used by languages, such as European languages. More specifically, the present invention provides a method for generating diacritics required for many different languages from a universal keyboard.

BACKGROUND OF THE INVENTION

Current keyboards are primarily used for data entry and are specifically designed for specific languages. As an example, U.S. English keyboards lack numerous accents, dieresis, cedillas and other diacritical marks (collectively referred to herein as diacritics) that are necessary to correctly type non-English languages. A character utilizing a diacritic is referenced herein as a diacritical character. In the increasingly global marketplace, a native of a country fluent in several languages may be working in the U.S. This person could find it difficult to communicate fluently in a European language because the U.S. keyboard has a limited number of diacritics available to the user.

A conventional approach to providing diacritics essential to a language is to utilize "national keyboards" that generate language specific accented characters. Typically, commonly used diacritical characters are assigned a unique key on the keyboard. Thus, for example, it is common to find the diacritical character "ñ" on a Spanish keyboard but not on a French keyboard since the "tilde" is not used in the French language. Similarly, the diacritical characters "à", "é" and "ù" are found on most French keyboards but not on Spanish keyboards while the diacritical characters "ä", "ö" and "ü" are found on German keyboards. However, each keyboard is designed primarily for one language. Persons who write in more than one language are required to either switch keyboards and use a different keyboard driver application tailored to the desired language, or improvise to generate the desired diacritic.

One problem arising from the use of national keyboards is that even though two keyboards may contain the same characters, their positions may be quite different. Thus, the position of the acute and grave accents on a keyboard designed for France is different from that of a keyboard design for Italy. Switching keyboards requires the user to remember different keyboard layouts, a complication that potentially slows keyboarding by the user. Further, switching keyboards requires additional keyboard driver applications as the placement of characters on the keyboard is different.

Conventional word processing applications make use of so-called "dead keys" to obviate the need for backspacing while entering accented characters that are not assigned a unique key. It will be appreciated that the keyboard would be much too large if every possible accented character were assigned a unique key. With a dead key, the operator initially selects the dead key appropriate to the required diacritic and then selects the appropriate character key to produce a diacritical character. This dead key enters the accent but does not advance the display. Reference is made to U.S. Pat. No. 4,204,089.

Only a few characters can be assigned to the dead keys, while over twenty-five different diacritical modifiers are required for European languages. In addition, some European characters use diacritics that are not modifications of existing characters but unique characters on their own. Consequently, these diacritical characters do not translate well to a "dead key" approach.

Another conventional approach to generating diacritics is to use a compose key. A key on a keyboard is designated as a "compose" key. Pressing the compose key and then a sequence of keys causes a keyboard driver application to interpret the sequence of two or three characters as a composition: i.e., <compose>+`+a=à. However, the user is required to remember many different combinations to produce the desired diacritical character, slowing the keyboard entry speed of the user.

Yet another conventional approach utilizes a repetition method. A user repeatedly presses a key to cycle through possible diacritics for the desired diacritical character. For example, one press of the letter "a" yields "a". A second press of the letter "a" yields "à". A third press of the letter "a" yields "á". A fourth press of the letter "a" yields "ä", etc. (Reference is made to U.S. Pat. No. 6,340,937.) However, the user is required to either remember where in the cycle the desired character is produced or focus on the keyboard and screen when cycling through the possible characters. This approach also slows keyboard entry speed of the user.

What is therefore needed is a system, a computer product, and an associated method that allow the use of a single keyboard (or an input keypad) to produce diacritics for different languages that use, for example, a Latin-based character set or a Roman character set. Further, a method is needed that allows a user of a U.S. keyboard to generate properly shaped diacritics in other languages in a user-friendly format. The need for such system and method has heretofore remained unsatisfied.

SUMMARY OF THE INVENTION

The present invention satisfies this need, and presents a system, a computer program product, and an associated method (collectively referred to herein as "the system" or "the present system") for using a standard keyboard such as a U.S. keyboard to conveniently generate diacritical characters used by Latin-based languages or languages based on a Roman character set. The present system allows users to type in many different languages from one keyboard layout, providing a universal keyboard for all languages using a Latin-based character set or a Roman character set. The key combination required to select a diacritic is consistent, independent of the language the user is typing.

The present system uses, for example, the normal U.S. QWERTY keyboard. Many conventional computer keyboards can detect three or four keys pressed at the same time. More than one key pressed at one time is referenced as a diacritic chord; the operation of pressing more than one key at a time is referenced as chording. The present system uses chording to obtain Latin-based characters or Roman characters modified by diacritics, i.e., diacritical characters.

The key combinations in the diacritic chord are chosen for the present system in such a way to aid memorization by positional association of the keys or by logic association of the keys within the diacritic chord. Use of a combination of positional association and logical association by the present system eliminates conflicts in mapping diacritics for different languages.

Positional association uses the relative positions of the keys within a diacritic chord to aid memorization or recall of the diacritic chord corresponding to a diacritical character.

With positional combinations, locations of keys within the diacritic chord are similar to the shape of the diacritical character. For example, a user selects a grave accent (`) by pressing a vowel key in conjunction with the key on the upper left of the vowel key. The grave accent leans to the left and the key on the upper left of the vowel key produces the desired diacritic; this combination is easy to remember from relative position of the keys. The user selects an acute accent ( ) by pressing a vowel key in conjunction with the key on the upper right of the vowel key. The acute accent leans to the right and the key on the upper right of the vowel key produces the desired diacritic; again, this combination is easy to remember from the relative position of the keys.

Rather than memorizing an unrelated key combination, a user can remember the required diacritic chord by simply looking at the keyboard layout. By building on existing keyboarding skills, the user can easily extend keyboarding capability to encompass a large number of diacritic characters.

The positional combination is associated with the desired letter. A user does not have to remember one key where the desired diacritic is located. Rather, the user remembers the diacritic relative to the modified letter. A user can select an umlaut by pressing a diacritic chord comprising the desired letter and both keys above the letter. Consequently, the user memorizes one template that can be applied to, for example, all vowels.

Logical association uses association of shape or sound to select the desired diacritic. For example, an umlaut used in German appears like a double quote ("). The present system produces a character modified by an umlaut when the user presses the letter and the double quote as a diacritic chord. For example, pressing the letter "a" and the double quote (") together yields the diacritical character, ä. Association of sound is used to produce the thorn character that sounds like "th"; the user presses a diacritic chord comprising the letter "t" and the letter "h".

The present system uses logical association to generate symbols. In the example illustrated below, pressing the dollar sign ($) with another key produces a monetary notation:
  pressing $+&=€ (euro); ($+e conflicts with é).
  pressing $+y=¥ (yen);
  pressing $+p=£ (pound, lira); and
  pressing $+c=¢ (cent), etc.
The "+" symbol indicates that the keys are pressed concurrently, in a diacritic chord.

The present system provides alternate diacritic chords for producing a diacritic character, allowing a user to select a diacritic chord that is most easy to remember. For example, a user selects an umlaut by pressing a diacritic chord comprising the desired letter and the double quote ("). Alternatively, the user selects an umlaut by pressing a diacritic chord comprising the desired letter and the two keys directly above the letter. For example:
  pressing a+"=ä or pressing q+w+a=ä;
  pressing e+"=ë or pressing 3+4+e=ë;
  pressing i+"=ï or pressing 8+9+i=ï;
  pressing o+"=ö or pressing 9+0+o=ö; and
  pressing u+"=ü or pressing 7+8+u=ü.

Providing alternate diacritic chords allows the user to use as few keys as possible in a diacritic chord. For example, q+w+a=ä requires three keys. However, selecting a Ä requires four keys: shift+q+w+a=Ä. The alternative diacritic chord for Ä requires only three keys: shift+a+"=Ä.

The present system provides a help screen overlay as a mnemonic to illustrate which diacritic chords provide the desired diacritical character. For example, a user presses a function key and the letter "a" to view all possible diacritic chord combinations that use the letter "a". In this manner, a user can quickly learn the diacritic chord combinations that produce diacritical characters for different languages.

In one embodiment, a mapping for producing desired diacritical characters is printed on a keyboard to provide a visual mnemonic for the user. In another embodiment, an input such as, for example, a function key restricts available diacritics to a selected language. In yet another embodiment, an input such as, for example, a function key is selected to enable or disable the help screen overlay.

In a further embodiment, the present system emits key-down events while comparing characters represented by the key-down events with a table of diacritic chords. Characters that are found to be part of a diacritic chord are stored in a queue in a buffer. If a diacritic chord is formed, the present system emits a backspace with the diacritic character. The backspace removes the previously emitted character from the screen, replacing it with the diacritic character.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 2 is a timeline illustrating a performance of the diacritic chording system of FIG. 1;

FIG. 3 is a timeline illustrating a performance of an embodiment of the diacritic chording system of FIG. 1;

FIG. 4 is comprised of FIGS. 4A, 4B, 4C, and 4D and represents an exemplary table of diacritic chords used by the diacritic chording system of FIG. 1 to produce diacritical characters;

DETAILED DESCRIPTION OF PREFERRED EMBODIMENTS

The following definitions and explanations provide background information pertaining to the technical field of the present invention, and are intended to facilitate the understanding of the present invention without limiting its scope:

Diacritic: A mark, such as the cedilla of facade or the acute accent of résumé, added to a letter to indicate a special phonetic value or distinguish words that are otherwise graphically identical.

Diacritical character: a character that comprises a diacritic or is otherwise unique to a language or set of languages such as, for example, the thorn character.

Diacritic chord: a set of keys pressed concurrently that are used to identify a diacritical character.

Figure 1:
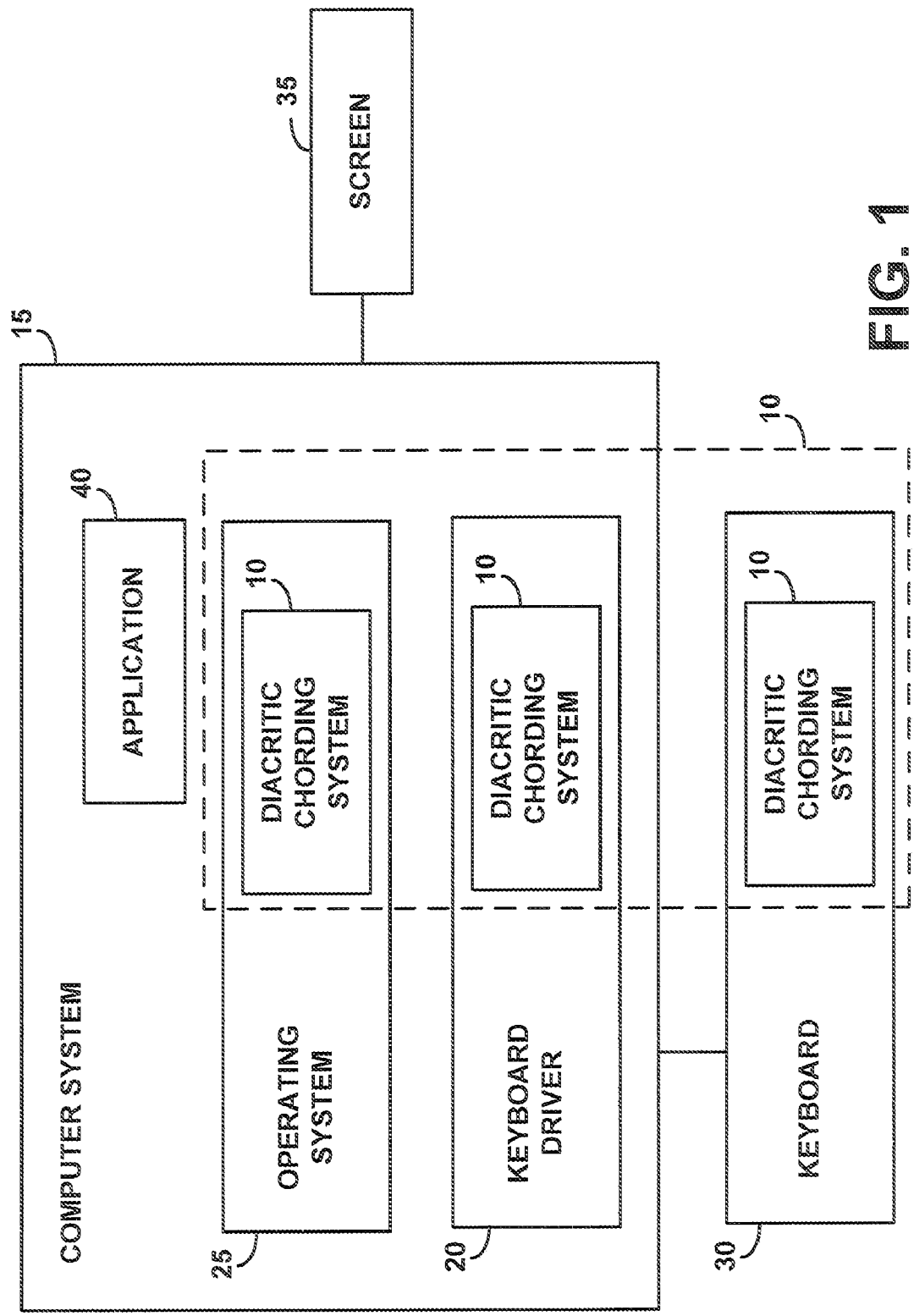
FIG. 1 is a schematic illustration of an exemplary operating environment in which a diacritic chording system of the present invention can be used.

FIG. 1 portrays an exemplary overall environment in which a system, a computer program product, and an associated method ("the system 10") for producing language specific diacritics for many languages from a standard keyboard layout according to the present invention may be used. The diacritic chording system (system 10) includes a software programming code or computer program product that is typically embedded within, or installed on a computer system 15. Alternatively, system 10 can be saved on a suitable storage medium such as a diskette, a CD, a hard drive, or like devices.

System 10 may be installed in a keyboard driver 20 of the computer system 15. In one embodiment, system 10 may be installed in the operating system 25 of the computer system 15. In a further embodiment, system 10 may be installed in a keyboard 30. In yet another embodiment, system 10 may be installed in any one or more of the operating system 25, the keyboard driver 20, or the keyboard 30. Characters generated by keyboard 30 are transmitted for display on a screen 35 either by the operating system 25 or an application 40 running on the computer system 15. Actions described herein as performed by the operating system 25 may be performed either by application 40 or by the operating system 25.

System 10 comprises a mechanism to detect simultaneous key-down events. System 10 intercepts key events from keyboard 30. Key-down events interpreted by system 10 as occurring concurrently are stored in a buffer. Concurrent key-down events are interpreted by system 10 as a diacritic chord. System 10 interprets as a diacritic chord all key-down events that occur within a predetermined time threshold. The predetermined time threshold can be adjusted for a specific keyboard. Typically, the predetermined time threshold is approximately 100 msec or less.

FIG. 2 illustrates an exemplary timeline 200 of key-down and key-up events in generating a letter "a" with a grave accent. Timeline 200 comprises a timeline 205 for keyboard 30, a timeline 210 for system 10, a timeline 215 for operating system 25, and an output timeline 220 for screen 35. The operating system 25 represents the operating system 25 and any applications that "draw" characters on screen 35. At $t_1$ 225, a user presses an "a" key. A key event representing the letter "a" is transmitted to system 10. System 10 stores the key event in a queue in a buffer at $t_2$ 230.

At $t_3$ 235, the user presses the "q" key while still holding down the "a" key. A key event representing the letter "q" is transmitted to system 10. At $t_4$ 240, system 10 compares the two key events stored in the buffer to a table of diacritic chords representing diacritical characters, selects the appropriate symbol or character combination, and transmits a diacritical character "à" to the operating system 25. The operating system 25 transmits the diacritical character "à" to screen 35 at $t_5$ 245. Screen 35 displays the diacritical character "à" at $t_5$ 250. The key-down events at $t_1$ 225 and $t_3$ 235 are not necessarily simultaneous. Rather, the key-down events at $t_1$ 225 and $t_3$ 235 are required by system 10 to occur within the predetermined time threshold, represented in FIG. 2 as a threshold 255.

If system 10 receives a key-up event after the key-down event at $t_1$ 225 and before the key-down event at $t_3$ 235, system 10 transmits a key event representing the letter "a" to the operating system 25. If the key-down event at $t_3$ 235 occurs after the threshold 255 has expired, system 10 sends a key event representing the letter "a" to the operating system 25. In this manner, system 10 distinguishes between key events that construct a diacritic chord for forming a diacritical character and key events representing individual characters.

The method of system 10 as represented by timeline 200 waits for a key-up event, the presence of key events in the buffer that represent a diacritic chord, or the expiration of the threshold 255 to transmit a character to screen 35. FIG. 3 illustrates a timeline 300 for one embodiment in which key events or characters are transmitted directly to screen 35. When system 10 detects a diacritic chord for forming a diacritical character, system 10 transmits a backspace followed by the diacritical character. The backspace removes the previously transmitted character, replacing the previously transmitted character or characters with the diacritical character.

Timeline 300 comprises a timeline 305 for keyboard 30, a timeline 310 for system 10, a timeline 315 for operating system 25, and an output timeline 320 for screen 35. At $t_1$ 325, a user presses an "a" key. A key event representing the letter "a" is transmitted to system 10. System 10 stores the key event in a queue in a buffer at $t_2$ 330 and transmits the key event to the operating system 25. At $t_3$ 335, the operating system 25 receives the key event. The operating system 25 transmits the character representing the key event to screen 35 at $t_4$ 340.

At $t_5$ 345, the user presses the "q" key. A key event representing the letter "q" is transmitted to system 10. At $t_6$ 350, system 10 stores the key event in the buffer and compares the key events stored in the buffer to a table of diacritic chords representing diacritical characters. If the key events stored in the buffer correspond to a diacritical character, system 10 selects the appropriate symbol or character combination; in this example, system 10 transmits a backspace and a diacritical character "à" to the operating system 25. The operating system 25 transmits the backspace and the diacritical character "à" to screen 35 at $t_7$ 355. The previously transmitted character is removed from screen 35 and the diacritical character "à" is displayed at $t_8$ 360. The key-down events at $t_1$ 325 and $t_5$ 345 are not necessarily simultaneous. Rather, the key-down events at $t_1$ 325 and $t_5$ 345 are required by system 10 to occur within the predetermined time threshold, represented in FIG. 3 as a threshold 365.

This embodiment allows transmission of a character directly to a screen 35, reducing delays between the key-down event and appearance of the character on screen 35. Otherwise, a character does not appear on screen 35 until after threshold 365 has expired so that system 10 can determine if the key-down event is part of a diacritic chord representing a diacritic character. As most of the letters entered by a user are not diacritic characters, this embodiment provides a means for more quickly transmitting characters to screen 35.

As before, if system 10 receives a key-up event after the key-down event at $t_1$ 325 and before the key-down event at $t_5$ 345, system 10 transmits a key event representing the letter "a" to the operating system 25. If the key-down event at $t_5$ 345 occurs after the threshold 365, system 10 sends a key event representing the letter "a" to the operating system 25. In this manner, system 10 distinguishes between key events that construct a diacritic chord for forming a diacritical character and key events representing individual characters.

FIG. 4 (FIGS. 4A, 4B, 4C, 4D) illustrates a table 400 of exemplary diacritic chords or key combinations that system 10 uses to form diacritical characters. Most of the diacritical characters are formed using two keystrokes. A small proportion of diacritical characters are formed using three keystrokes. Upper case diacritical characters are formed by adding the "shift" key to the diacritic chord listed in FIG. 4. System 10 consults the table 400 of diacritic chords illustrated by FIG. 4 when a diacritic chord is detected in the buffer. If a match is found, system 10 emits the resulting diacritical character. Otherwise, system 10 emits each character in the buffer individually.

Figure 5:
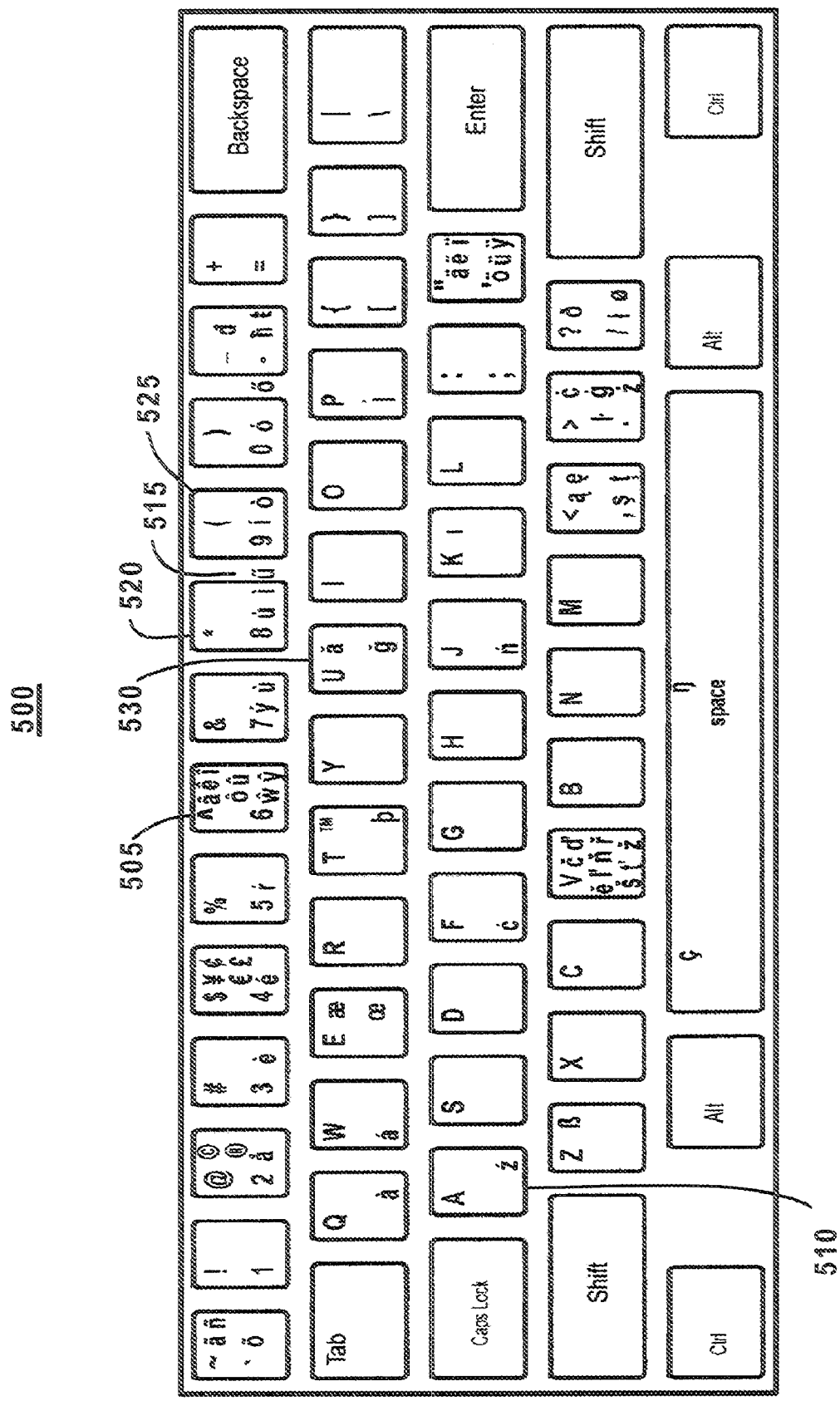
FIG. 5 is a schematic illustration of an exemplary keyboard illustrating a visual mnemonic indicating keys that can be used by the diacritic chording system of FIG. 1 to generate diacritical characters.

FIG. 5 illustrates an exemplary keyboard 500 that comprises notations of the diacritical characters that may be formed by chording. For example, the key 505 for the number 6 is used in a diacritic chord to add a diacritic "^" to letters. A user can easily see by looking at the keyboard 500 that pressing a key 510 for the letter "a" and the key 505 for the number 6 in a diacritic chord generates a diacritical character "â". The letter "u" with the diacritic " (symbol 515) is placed between a key 520 for the number 8 and a key 525 for the number 9 to indicate that symbol 515 is formed when a user concurrently presses a key 530 for the letter "u", the key 520 for the number 8, and the key 525 for the number 9.

Figure 6A:
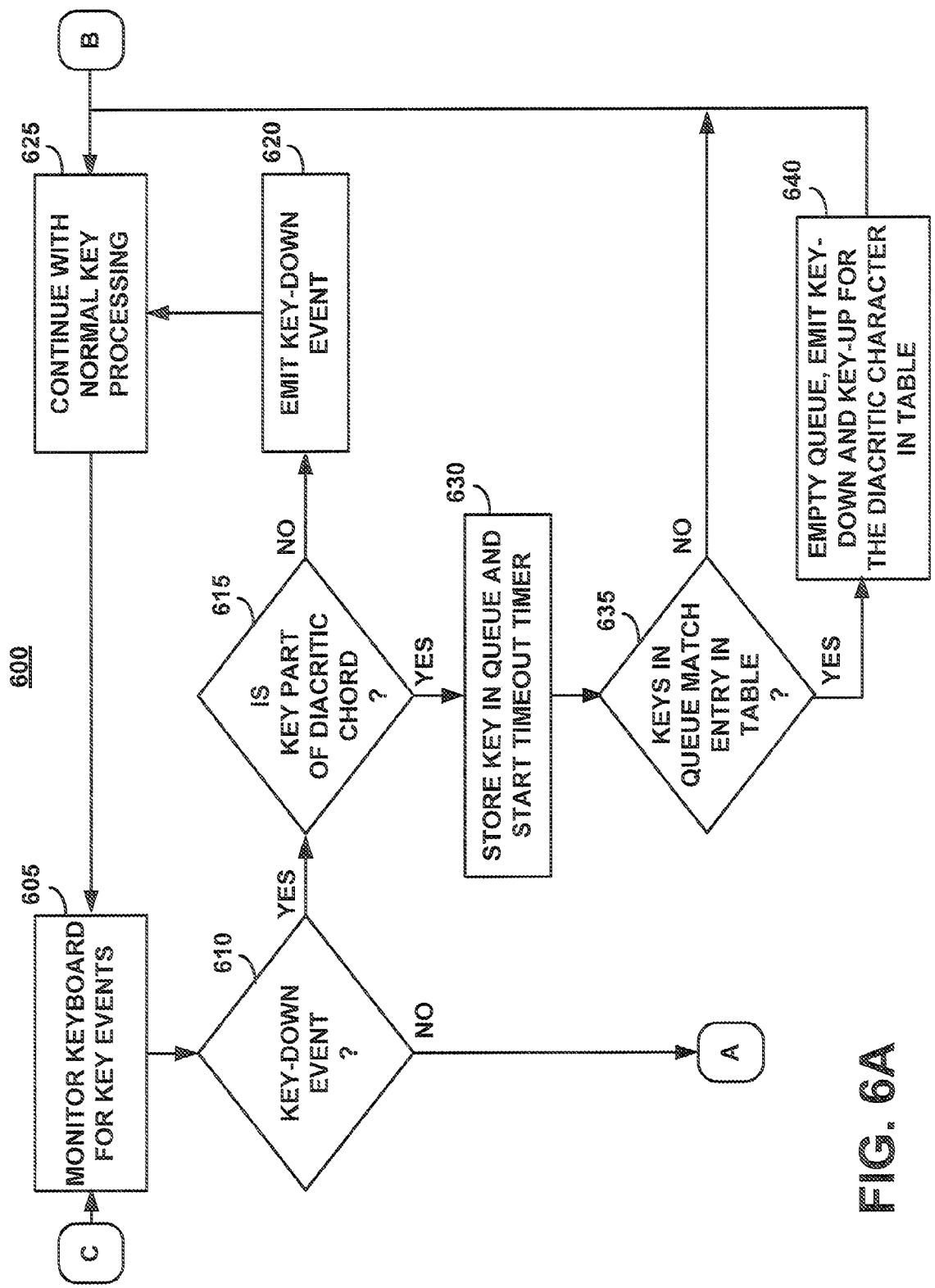
FIG. 6 comprises FIGS. 6A and 6B and represents a process flow chart illustrating a method of operation of the diacritic chording system of FIG. 1.
Figure 6B:
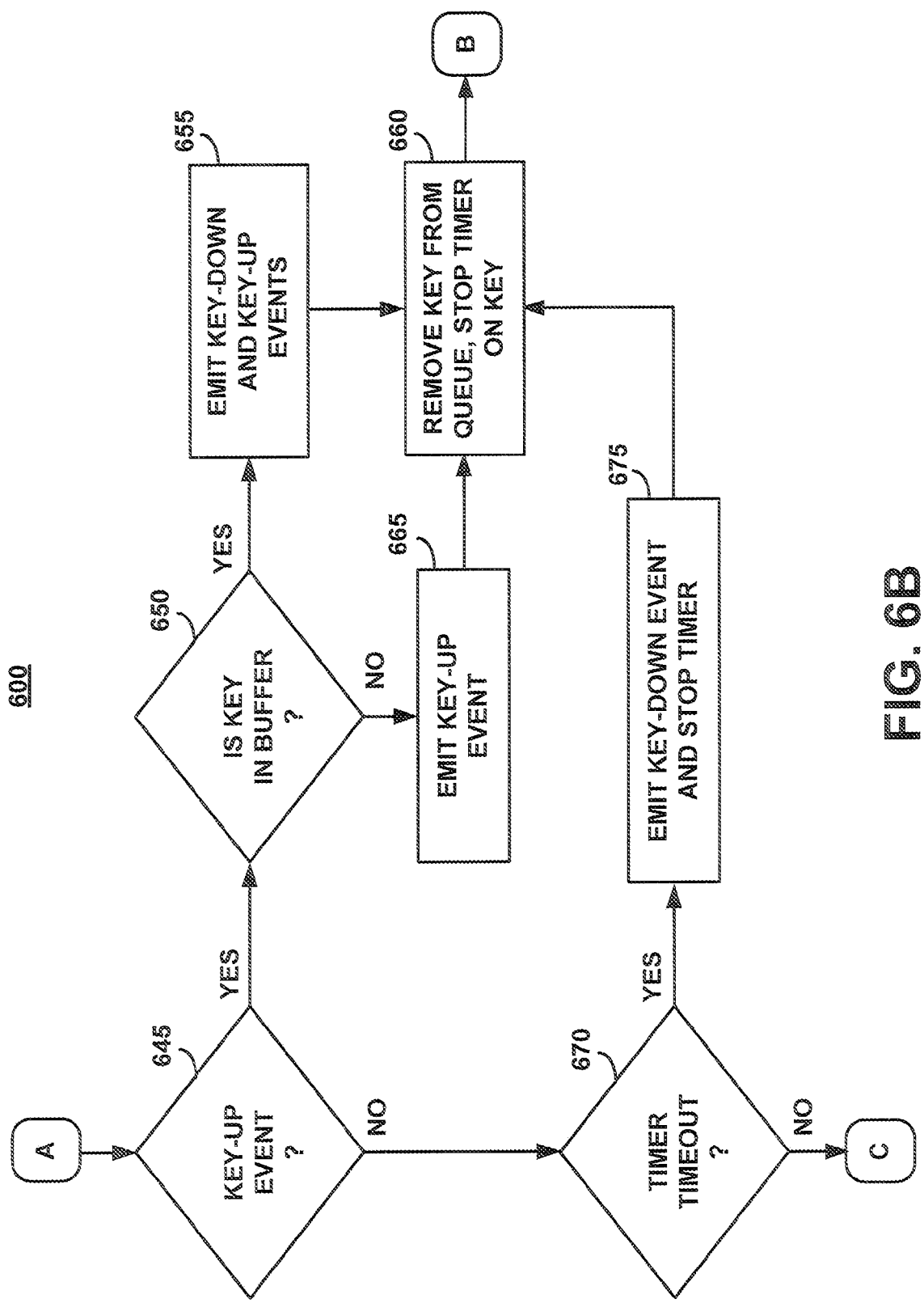

FIG. 6 (FIGS. 6A, 6B) illustrates a method 600 of operation of system 10 for recognizing a diacritic chord and selecting a diacritical character corresponding to the diacritic chord. System 10 monitors keyboard 30 for key events at step 605. When a key event occurs, system 10 determines whether the key event is a key-down event at decision step 610. If the key event is a key-down event, system 10 determines at decision step 615 whether the character represented by the key-down event is part of a diacritic chord. If the character represented by the key-down event is not part of a diacritic chord, system 10 emits the key-down event at step 620. At step 625, system 10 continues with normal key processing and returns to step 605.

If at decision step 615 the character represented by the key event is part of a diacritic chord, system 10 stores the key in a queue in a buffer at step 630 and starts a timeout timer for that key. At decision step 635, system 10 determines whether keys accumulated in the queue match a diacritic chord in the table 400 of diacritic chords. If a match is found, system 10 empties the queue in the buffer, emits a key-down event and key-up event corresponding to the diacritic character in the table 400 of diacritic chords (step 640). System 10 proceeds to step 625 and processing continues as before. If no match is found at decision step 635, system 10 proceeds to step 625 and processing continues as before.

If a key-down event is not detected at decision step 610, system 10 determines whether the key event is a key-up event at decision step 645. If yes, system 10 determines whether the key represented by the key-up event is currently stored in the buffer at decision step 650. If the key represented by the key-up event is stored in the buffer, system 10 emits the key-down and key-up events for that key at step 655. At step 660, system 10 removes the key from the queue in the buffer and stops the timeout timer for that key. System 10 proceeds to step 625, and processing continues as before.

If, at decision step 650, system 10 finds that the key represented by the key-up event is not stored in the queue in the buffer, system 10 emits a key-up event at step 665. System 10 proceeds to step 660 and processing continues as before.

If, at decision step 645, system 10 determines that the key event is not a key-up event, system 10 determines whether the timer timeout has occurred at decision step 670. If the timer timeout has occurred, system 10 emits a key-down event for the key currently stored in the queue in the buffer and stops the timeout timer for that key at step 675. System 10 proceeds to step 660 and processing continues as before.

The character detection and transformation process of system 10 is implemented as procedures that run in different threads. A pseudocode for the character detection and transformation process is as follows:

Procedure Transform Characters

Variables:

```
THRESHOLD : INTEGER
EMITTED : CHAR
RESULT : CHAR
BUFFER : LIST{CHAR}
CONVERTED : LIST{CHAR}
EVENT : KEY_EVENT
MATCH : KEY_EVENT
KEY_EVENT {
```

-continued

```
TYPE : {KEY-DOWN, KEY-UP}
TIMESTAMP : INTEGER
CHAR : CHAR
}
do
EVENT := readKeyboard( );
if EVENT.TYPE = KEY-DOWN then
   BUFFER.add(EVENT);
   // If the buffer contains two or more KEY-DOWN events a search is
performed in the transformation table. If a match is
   // found the events are removed from the buffer and a KEY-DOWN
event corresponding to the transformed character is send to
   // the normal key processing in their place. Another copy of the
transformed character is put into the EMITTED variable. A copy
   // of the matching characters is put into the CONVERTED buffer.
   if BUFFER.size > 1 then
      RESULT := transform(BUFFER)
      if RESULT != nil then
         EMITTED := RESULT
         CONVERTED := BUFFER
         BUFFER := nil
         sendToNormalProcessing(EMITTED)
      end
   end
elseif EVENT.TYPE = KEY-UP then
   // If a KEY-UP is received and the corresponding KEY-DOWN event
is still in the buffer, the KEY-DOWN event is
   // removed from the buffer and a KEY-DOWN and KEY-UP event
are sent to normal event processing.
   MATCH := BUFFER.searchSameCharacterEvent(EVENT)
   if MATCH != nil then
      BUFFER.remove(MATCH)
      sendToNormalProcessing(MATCH)
      sendToNormalProcessing(EVENT)
   else
      MATCH := CONVERTED.searchSameCharacterEvent(EVENT)
      if MATCH != nil then
         // Otherwise, if the corresponding KEY-DOWN event
         // is in the CONVERTED buffer the KEY-DOWN
         // event is removed from CONVERTED. If this empties
         // CONVERTED a KEY-UP event corresponding
         // to the EMITTED character is sent to
         // normal key processing and EMITTED is cleared.
         CONVERTED.remove(MATCH)
         if CONVERTED.isEmpty( ) then
            EMITTED.TYPE := KEY-UP
            sendToNormalProcessing(EMITTED)
            EMITTED := nil
         end
      end
   end
end
end
```

Another thread of the character detection and transformation process expires old key events:

```
procedure expireEvents
variables
THRESHOLD : INTEGER
do
THRESHOLD := 80 // milliseconds
// If any timestamp of an event in the buffer is older than THRESHOLD
milliseconds,
// the event is removed from the buffer and sent to the normal key event
processing.
foreach CHARACTER in BUFFER
   if NOW - CHARACTER.TIMESTAMP > THRESHOLD then
      BUFFER.remove(CHARACTER)
      sendToNormalProcessing(CHARACTER)
   end
end
end
```

It is to be understood that the specific embodiments of the invention that have been described are merely illustrative of certain applications of the principle of the present invention. Numerous modifications may be made to the system and method for producing language specific diacritics for many languages from a standard keyboard layout described herein without departing from the spirit and scope of the present invention. Moreover, while the present invention is described for illustration purpose only in relation to diacritic symbols for Latin-based languages or languages using a Roman character set, it should be clear that the invention is applicable as well to, for example, any character set in which diacritic chords can be used to form additional characters.

What is claimed is:

1. A method of generating a plurality of language specific diacritics for languages using a single layout for a character entry device, comprising:
   monitoring the character entry device for a plurality of concurrent selection events wherein the selection events comprise at least a first selection event and a second selection event;
   determining whether a set of diacritic chords comprises a first character represented by the first selection event and a second character represented by the second selection event;
   storing the first character in a queue if the first character forms part of the set of the diacritic chords, and emitting the first character if the first character is not part of the set of diacritic chords;
   adding the second selection event to the queue if the set of diacritic chords comprises the second selection;
   determining whether the first character and the second character are related by a predetermined mnemonic positional association on the character entry device; and
   if the first character and the second character are related by the predetermined positional association on the character entry device, emitting a diacritic character.

2. The method of claim 1, wherein determining whether the set of diacritic chords comprises the first character comprises comparing the first character with a table of diacritic chords.

3. The method of claim 1, further comprising upon making the selection event, providing an overlay screen that illustrates candidate diacritic characters that can be generated by making the second selection event.

4. The method of claim 1, wherein the character entry device comprises a keyboard.

5. The method of claim 4, wherein the keyboard comprises a plurality of keys that are marked with available diacritical characters.

6. The method of claim 4, further comprising using a function key to limit available diacritic characters to a user-specified language.

7. The method of claim 1, further comprising starting a first timer for the first selection event if the first character is part of the set of diacritic chords.

8. The method of claim 7, further comprising emitting the first character if the first timer indicates that a time threshold has been exceeded without occurrence of the second selection event.

9. The method of claim 7, wherein the time threshold is adjustable by a user.

10. The method of claim 1, wherein the time threshold is approximately 100 msec.

11. The method of claim 1, wherein on receiving the first selection event the first character is emitted, and if the second selection event comprises a diacritic chord, emitting a back space to retract a previously emitted character followed by an emission of the diacritic character.

12. A method of generating a plurality of language specific diacritics for a plurality of languages using a single layout for a character entry device, comprising:
   monitoring the character entry device for a plurality of concurrent selection events wherein the selection events comprise at least a first selection event and a second selection event;
   determining whether a set of diacritic chords comprises a first character represented by the first selection event and a second character represented by the second selection event;
   storing the first character in a queue if the first character forms part of the set of the diacritic chords, and emitting the first character if the first character is not part of the set of diacritic chords;
   adding the second selection event to the queue if the set of diacritic chords comprises the second selection;
   determining whether the first character and the second character are related by a predetermined logic positional association on the character entry device; and
   if the first character and the second character are related by the predetermined logic positional association on the character entry device, emitting a diacritic character.

13. The method of claim 12, further comprising starting a first timer for the first selection event if the first character is part of the set of diacritic chords.

14. The method of claim 13, further comprising emitting the first character if the first timer indicates that a time threshold has been exceeded without occurrence of the second selection event.

15. The method of claim 13, wherein the time threshold is adjustable by a user.

16. The method of claim 12, wherein on receiving the first selection event the first character is emitted, and if the second selection event comprises a diacritic chord, emitting a back space to retract a previously emitted character followed by an emission of the diacritic character.

17. A computer program product having executable instruction codes for generating language specific diacritics for a plurality of languages using a single layout for a character entry device, comprising:
   a first set of instruction codes for monitoring the character entry device for a plurality of concurrent selection events wherein the selection events comprise at least a first selection event and a second selection event;
   a second set of instruction codes for determining whether a set of diacritic chords comprises a first character represented by the first selection event and a second character represented by the second selection event;
   a third set of instruction codes for storing the first character in a queue if the first character forms part of the set of the diacritic chords, and emitting the first character if the first character is not part of the set of diacritic chords;
   a fourth set of instruction codes for adding the second selection event to the queue if the set of diacritic chords comprises the second selection;
   a fifth set of instruction codes for determining whether the first character and the second character are related by a predetermined mnemonic positional association on the character entry device; and
   a sixth set of instruction codes for emitting a diacritic character if the first character and the second character are related by the predetermined positional association on the character entry device.

18. A computer program product having executable instruction codes for generating language specific diacritics for a plurality of languages using a single layout for a character entry device, comprising:
- a first set of instruction codes for monitoring the character entry device for a plurality of concurrent selection events wherein the selection events comprise at least a first selection event and a second selection event;
- a second set of instruction codes for determining whether a set of diacritic chords comprises a first character represented by the first selection event and a second character represented by the second selection event;
- a third set of instruction codes for storing the first character in a queue if the first character forms part of the set of the diacritic chords, and emitting the first character if the first character is not part of the set of diacritic chords;
- a fourth set of instruction codes for adding the second selection event to the queue if the set of diacritic chords comprises the second selection;
- a fifth set of instruction codes for determining whether the first character and the second character are related by a predetermined logic positional association on the character entry device; and
- a sixth set of instruction codes for emitting a diacritic character if the first character and the second character are related by the predetermined logic positional association on the character entry device.

19. A character entry device for generating language specific diacritics for a plurality of languages using a single layout, comprising:
- means for monitoring the character entry device for a plurality of concurrent selection events wherein the selection events comprise at least a first selection event and a second selection event;
- means for determining whether a set of diacritic chords comprises a first character represented by the first selection event and a second character represented by the second selection event;
- wherein the first character is stored in a queue if the first character forms part of the set of the diacritic chords, and wherein the first character is emitted if the first character is not part of the set of diacritic chords;
- means for adding the second selection event to the queue if the set of diacritic chords comprises the second selection;
- means for determining whether the first character and the second character are related by a predetermined mnemonic positional association on the character entry device; and
- means for emitting a diacritic character if the first character and the second character are related by the predetermined positional association on the character entry device.

20. A character entry device for generating language specific diacritics for a plurality of languages using a single layout, comprising:
- means for monitoring the character entry device for a plurality of concurrent selection events wherein the selection events comprise at least a first selection event and a second selection event;
- means for determining whether a set of diacritic chords comprises a first character represented by the first selection event and a second character represented by the second selection event;
- wherein the first character is stored in a queue if the first character forms part of the set of the diacritic chords, and wherein the first character is emitted if the first character is not part of the set of diacritic chords;
- means for adding the second selection event to the queue if the set of diacritic chords comprises the second selection;
- means for determining whether the first character and the second character are related by a predetermined logic positional association on the character entry device; and
- means for emitting a diacritic character if the first character and the second character are related by the predetermined logic association on the character entry device.

* * * * *

UNITED STATES PATENT AND TRADEMARK OFFICE
CERTIFICATE OF CORRECTION

PATENT NO. : 7,595,742 B2  Page 1 of 1
APPLICATION NO. : 10/904242
DATED : September 29, 2009
INVENTOR(S) : Cozzi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Twenty-eighth Day of September, 2010

David J. Kappos
*Director of the United States Patent and Trademark Office*